United States Patent [19]

Hoff, Jr.

[11] 4,035,446

[45] July 12, 1977

[54] POLYCHLOROPRENE SOL-GEL BLENDS

[75] Inventor: Edwin F. Hoff, Jr., Houston, Tex.

[73] Assignee: Petro-Tex Chemical Corporation, Houston, Tex.

[21] Appl. No.: 498,067

[22] Filed: Aug. 16, 1974

[51] Int. Cl.$^2$ .................................... C08L 11/00
[52] U.S. Cl. .............................................. 260/890
[58] Field of Search ............... 260/890, 92.3, 455 B

[56] References Cited

U.S. PATENT DOCUMENTS

| | | | |
|---|---|---|---|
| 3,655,827 | 4/1972 | Finlay et al. | 260/890 |
| 3,692,875 | 9/1972 | Jenner | 260/890 |
| 3,808,173 | 4/1974 | Orihashi | 260/92.3 |
| 3,849,519 | 11/1974 | Kadowaki et al. | 260/890 |

Primary Examiner—J. Ziegler
Attorney, Agent, or Firm—Kenneth H. Johnson; N. Elton Dry

[57] ABSTRACT

Novel polychloroprene sol-gel blends employing as crosslinking agents in the gel portion thereof a polymerizable monomer having three double bonds which will copolymerize with chloroprene and as chain-transfer agent in the sol of a sulfur containing compound including prior art mercaptans, dialkyl xanthogen disulfides and new polysulfides to produce vulcanizates having properties equal to or superior to prior sol-gel blends requiring the use of only dialkyl xanthogen disulfides as the sol chain-transfer agents.

25 Claims, No Drawings

POLYCHLOROPRENE SOL-GEL BLENDS

BACKGROUND OF THE INVENTION

Polychloroprene blends having improved processing characteristics have been developed by blending polychloroprenes which are benzene-soluble referred to as "sols", with polychloroprenes which are benzene-insoluble referred to as "gels". The resulting blends are frequently referred to as "easily processable" blends. Examples of these blends may be found in U.S. Pat. Nos. 3,042,652; 3,147,317 and 3,147,318. It is a continuing object in the art to improve blends of this type to give them better processing characteristics, improved physical characteristics, and to reduce the cost of producing the blends.

It was a disadvantage of many of the blends of sol and gel chloroprene polymers such as those described in the aforementioned patents that they yielded vulcanizates of low tensile strengths than those vulcanizates derived solely from the sol polychloroprene alone. Recently, however, a U.S. patent issued to Joseph B. Finley, et al, U.S. Pat. No. 3,655,827, granted Apr. 11, 1972, which disclosed a method of overcoming this disadvantage. Finley et al disclosed that superior blends are prepared from sols having dialkyl xanthogen disulfides as modifying or chain-transfer agents and gels having crosslinking monomers containing two or more polymerizable double bonds.

The Finley et al examples demonstrated the substantial superiority of the easily processable rubbers wherein the sol contained the dialkyl xanthogen disulfides and the gels contained ethylene dimethacrylate as compared to easily processable blends wherein the sol was made with dodecyl mercaptan and the gel was made with the ethylene dimethacrylate. Thus, in order to take advantage of the invention as disclosed and taught by Finley et al, one must use the dialkyl xanthogen disulfides and thereby forego those sol polymers produced for example with the older mercaptans. However, nowhere in the art is it suggested that a copolymerizable monomer comprising a triester of a triol and unsaturated acids will provide the same degree of benefit as Finley et al observed but without the necessity of using a dialkyl xanthogen disulfide as Finley et al. Nor is there any suggestion in the art that a copolymerizable monomer as defined above is substantially and unexpectedly superior and more efficient than the diester monomer employed in the Finley et al examples.

It is the advantage of the present invention that superior and improved easily processable blends can be made from sols which are prepared with other modifying or chain-transfer agents than the dialkyl xanthogen disulfides. It is a further advantage of the present invention that the dialkyl xanthogen disulfides and newly discovered modifying or chain-transfer agents also produce superior easily processble blends. It is a further feature of the present invention that blends produced according to the present invention have improved die swell characteristics over the prior art blends.

SUMMARY OF THE INVENTION

Briefly stated, the present invention is a polychloroprene sol-gel blend elastomer composition comprising an intimate mixture of a benzene-soluble polymer prepared by polymerizing chloroprene to a monomer conversion at which benzene-soluble polymer is obtained in aqueous emulsion containing the chloroprene and a sulfur containing chain-transfer agent; and a benzene-insoluble polymer of chloroprene prepared by having present in the polymerization system a monomer having the general formula

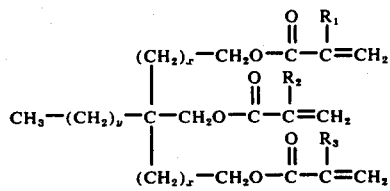

wherein $x$ is 0 or an integer of from 1 to 4 and is preferably 0; $y$ is 0 or an integer of from 1 to 4 and is preferably 1; $R_1$, $R_2$, and $R_3$ represent hydrogen or an alkyl radical with from 1 to 4 carbon atoms and is preferably $-CH_3$. This is a rather surprising discovery since Finley et al clearly show that the sol prepared from dodecyl mercaptan when used in making the easily processed rubber was quite inferior using the diunsaturated crosslinking agent. Thus, even though Finley et al made a broad prophetic statement that the copolymerizable monomer have at least two unsaturations, it is quite apparent that Finley et al did not proceed beyond the examples set forth or else it would have been discovered that the tri-unsaturated ester compounds recited here produce superior blended sol-gel mixtures without regard to the nature of the chain transfer agent.

DETAILED DESCRIPTION OF THE PREFERRED EMBODIMENTS

The sol component may be prepared by techniques such as disclosed in U.S. Pat. Nos. 1,950,436; 2,227,517; 2,321,693; 2,371,719; 2,463,009; 2,831,842; 2,914,497; 3,042,652; 3,147,318; 3,147,317; 3,147,318; 3,655,827; British Pat. Nos. 1,237,750 and 1,158,970. Process and methods for the polymerization of chloroprene are disclosed, for example, in *Encyclopedia of Polymer Science and Technology*, Vol. 3, p. 705–730 Interscience, 1965.

SOL PREPARATION

Comonomers may be employed with the selection and quantities of comonomer being chosen to produce a sol polymer. In this application, the term "polymers of chloroprene" encompasses polymers in which chloroprene is the major monomer. Examples of comonomers are 2,3-dichloro-1,3-butadiene; acrylonitrile; methyl methacrylate, and other esters, amides, nitriles, vinyl aromatic compounds such as styrene, aliphatic conjugated diolefins such as isoprene, vinyl ethers such as methyl vinyl ether. Usually the total amount of comonomers will represent no greater than 25 mol percent of the total monomers and preferably will constitute less than 15 mol percent of the total monomers including chloroprene.

The polymerization is carried out in an aqueous systems and may be batch or continuous processes. Emulsifiers may be employed such as the salts of rosins and rosin derivatives such as wood rosin, disproportionated rosin or hydrogenated rosin; ammonium, sodium or potassium salts of long chain fatty acids; alkaline and alkaline earth salts of the condensate of formaldehyde and naphthalene sulfonic acid; octyl sulfate salts; nonionic surface active agents such as the ethylene oxide or propylene oxide condensation products. Additional emulsifying agents are disclosed in U.S. Pat. No. 2,264,173.

The pH of the aqueous emulsion for polymerization may be varied and can be acidic, neutral or alkaline; however, it is preferred to have a pH in the alkaline range of about 7 to 13.5.

Conventional catalysts for chloroprene polymerization may be employed and preferred catalysts are peroxide catalysts of the organic or inorganic type. Examples of organic peroxides are benzoyl peroxide, cumene hydroperoxide, tertiary-butyl isopropylbenzene hydroperoxide, azo catalysts such as alpha-alpha' -azo-bis-isobutyronitrile and the like. Suitable inorganic peroxides are salts of inorganic per acids including persulfates, perborates or percarbonates e.g. ammonium or potassium persulfate and hydrogen peroxide. The catalyst may be used in amounts required to bring about polymerization at any desired rate with suitable ranges being from 0.001 to 0.5 parts by weight per 100 parts of polymerizable monomer.

The usual modifiers or other agents may be present in the emulsion. For instance, the polymerization may be carried out in the presence of sulfur to produce a sulfur modified polychloroprene. Also, chain-transfer agents may be employed such as the alkyl mercaptans, e.g. dodecyl mercaptan, iodoform, benzyl iodide and dialkyl xanthogen disulfides e.g. diisopropyl xanthogen disulfide and polysulfide compounds, e.g., i-propyl (o-ethyl dithiocarbonoxy) sulfide. Preferred modifiers are mercaptans and dialkyl xanthogen disulfides with from 0.10 to 3 parts by weight per 100 parts of total monomer with the range of about 0.25 to 0.6 being especially preferred.

A particularly valuable group of chain-transfer agents are the polysulfide compounds noted above. The polysulfides have the formula

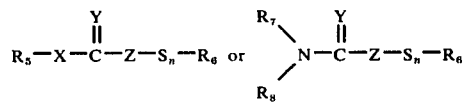

wherein X, Y and Z are selected from the group consisting of oxygen and sulfur, $R_5$ is a hydrocarbon radical having from 1 to 8 carbon atoms, $R_6$ is a hydrocarbon radical having from 1 to 8 carbon atoms or is a radical the same as

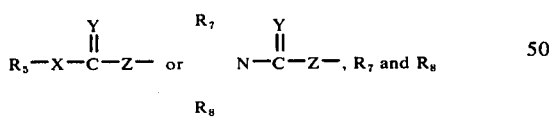

are selected from the group consisting of hydrocarbon radicals having from 1 to 8 carbon atoms or hydrogen with at least one of $R_7$ and $R_8$ not being hydrogen and $n$ is 1 to 4. Compounds of this type may be formed, e.g. as disclosed in Twiss, D., JACS 49, February 1927, p. 491–494. The hydrocarbon radicals can be acyclic, cycloaliphatic, aromatic or combinations thereof. For example, the radicals can be methyl, ethyl, n-propyl, isopropyl, n-butyl, isobutyl, n-pentyl, 2-ethyl hexyl, cycloaliphatic radicals having 5 or 6 carbons, aryl radicals such as phenyl, alkaryl radicals such as methylphenyl, combinations thereof and so forth. Examples of polysulfide compounds which are di(o-ethyl dithiocarbonoxy) sulfide, di(o-ethyl dithiocarbonoxy) disulfide, o-isopropyl o-ethyl dithiocarbonoxy disulfide and so forth. Particularly useful polysulfides are those having the general structure

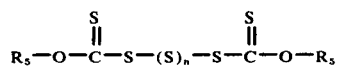

wherein $R_5$ and $n$ have the significance noted above. Particularly preferred are polysulfides of the structure

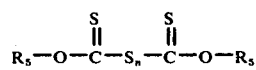

wherein $n$ is 3 to 4, such as di(o-isopropyl dithiocarbonoxy) sulfide.

The usual methods may be employed to prepare an aqueous emulsion of the monomeric material and emulsifying agent and water. The proportions are not critical, but generally, the monomer will be present in an amount such as from 30 to 60 percent by weight based on the total weight of the composition. The temperature of polymerization may be varied with suitable ranges being from 0° to 90° C with the preferred range being between 15° and 55° C. The polymerizations may be short stopped by the addition of agents such as para-tertiary-butyl catechol and thiodiphenylamine.

Gel Preparation

The gel or benzene insoluble soluble polymer may be produced by the general techniques to produce the gel polymer such as disclosed in U.S. Pat. Nos. 3,147,317; 3,147,318 and 3,655,827. Normally, to obtain a gel, the percent conversion will be high, such as from about 80 or 85 to 100 percent. In order to obtain a gel, peroxy compounds may be used as disclosed in U.S. Pat. No. 3,147,318 or radiation may be employed as disclosed in U.S. Pat. No. 3,042,652. In general, the same methods of polymerization described above for the preparation of the sol polymer may be employed so long as the technique is varied to obtain a gel or crosslinked polymer i.e., the emulsifiers, temperature of polymerization range, catalysts, pH, proportions of reactants and so forth as described above may be employed. Mercaptan or dialkyl xanthogen disulfides can be employed e.g., as exemplified in U.S. Pat. No. 3,655,827.

The gel polymer is prepared employing as a comonomer a trihydric ester of the general formula:

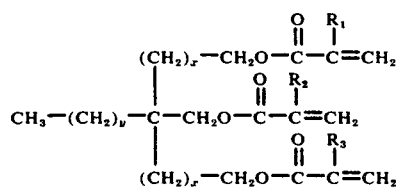

wherein $x$, $y$, $R_1$, $R_2$ and $R_3$ have the significance given above. The preferred trihydric alcohol is trimethylol propane. Examples of suitable compounds are the trimethacrylic, or mixtured esters of methacrylic acids of trimethylol propane, trimethylol butane, trimethylol pentane, trimethylol hexane, trimethylol heptane; dimethylol monobutylol butane or dimethylol monopentylol propane. Preferred comonomer is the trimethylacrylic esters of trimethylolpropane.

In addition to the trihydric ester, the other comonomers may be additionally employed with the types of monomers being the same as described for the preparation of the sol polymer. The total comonomer in the gel will be less than 50 weight percent of the total monomers and the total amount of triester will be no greater than 20 weight percent of total monomers such as from about 0.5 to 20 weight percent with a preferred range being no greater than about 10 weight percent such as from about 0.5 to about 10 weight percent of total monomers. One of the advantages of this invention is that 5 percent or less of triester is effective as an excellent cross-linking agent, e.g., from 0.5 to 5 weight percent more preferably 1.5 to 3 percent.

The gel polymer is normally obtained at monomer conversions such as at least 80 percent or 90 percent, but this can be varied so long as gel polymer is obtained.

The gel and sol polymers can be blended in a conventional manner as described, for example, in U.S. Pat. Nos. 3,147,317 and 3,655,827 to give an intimate mixture. A preferred method is to thoroughly blend the latices and then isolate as by coagulation or drying. The blends may also be accomplished by isolating the polymers separately and then intimately blending the isolated polymers. The polymers may be blended e.g. in a weight ratio of sol to gel of from 95:5 to 20:80 with better results normally obtained at sol to gel ratios of from about 50:50 to 80:20.

The gel-sol blends can be cured by conventional means such as disclosed in chapters II and III of "The Neoprenes" by R. M. Murray et al. (1963). The cured compositions are useful such as for wire coatings.

It has been found that the presence of some modifier or chain-transfer agent as described above in the gel is essential to obtaining greatest improvement in results when employing the crosslinking monomers of the present invention. Generally about 0.09 to 1.5 parts per hundred parts of total monomer by weight would be employed, depending on chain-transfer agent and the other variables in the polymerization process. Within this narrow range, it can be demonstrated there is an improvement in properties of the blend.

EXAMPLES 1 and 2

These examples demonstrate that the crosslinking agents according to the present invention are more efficient. Approximately one-half the moles of trimethylolpropanetrimethacrylate(TPT) containing fewer potential copolymerizable sites were used than the prior art ethylene glycol dimethacrylate (EGD) at this concentration which has approximately 14% more methacrylate groups. The comparison of properties is made in TABLE I below.

Latex Preparation

Sol and Gel latexes were prepared according to the following recipe. The polymerizations were carried out under a nitrogen blanket at 40° C. Polymerizations were carried out to the desired conversions by controlling the rate at which catalyst was added. Catalyst is an aqueous solution which is 0.07% in sodium 2-anthraquinine sulfonate and 0.36% in potassium persulfate. After reaching the desired conversion, polymerization was stopped by adding an emulsion containing 0.01 parts per hundred total monomer (phtm) each of phenothiazine and 4-tertiary-butylpyrocatechol. The latex was then steam stripped of unreacted monomer. The latex is then acidified to a pH of 6.3 using a 10% acetic acid solution and isolated by freeze roll.

LATEX RECIPES

| EXAMPLE | 1 | | 2 | |
|---|---|---|---|---|
| FORM | Sol | Gel | Sol | Gel |
| Chloroprene[1] | 100.000 | 98.000 | 100.000 | 98.000 |
| Modifier | | | | |
| Dodecyl mercaptan | 0.268 | — | 0.219 | — |
| Diisopropyl xanthogen disulfide | — | 1.000 | — | 1.000 |
| Crosslinking Agent | | | | |
| Ethylene dimethacrylate | | 2.000 | | |
| Trimethylol propane trimethacrylate | — | — | | 2.000 |
| Disproportionated rosin[2] | 3.047 | 3.047 | 3.047 | 3.047 |
| Butylated hydroxy toluene | 0.100 | 0.100 | 0.100 | 0.100 |
| Water | 100.000 | 100.000 | 100.000 | 100.000 |
| Sodium hydroxide | 0.540 | 0.695 | 0.540 | 0.695 |
| Sodium salt of the condensate of naphthalene sulfonic acid and formaldehyde | 0.700 | 0.700 | 0.700 | 0.700 |
| Sodium sulfite | 0.300 | 0.300 | 0.300 | 0.300 |
| Monomer conversion % | 70 | 82 | 70 | 82 |

[1]Recipe quantities in parts per hundred total monomer (phtm)
[2]Hercules 731 - SA Example 1 employs a prior art crosslinking agent and Example 2 employs a crosslinking agent according to the invention.

The sol and gel of each Example blended in the ratio of 3 parts sol to 1 part gel, based on solids in the latexes. A carbon black compound for testing was prepared according to the following formulation in a Banbury mixer, sheeted in a roll mill and tested.

CARBON BLACK COMPOUND FORMULA

| | Parts by Weight |
|---|---|
| Polymer blend | 1000 |
| N-phenyl-1-naphthylamine | 20 |
| Stearic acid | 5 |
| Magnesia | 40 |
| Carbon black | 290 |
| Zinc oxide | 50 |
| 2-mercapt-2-imidazoline* (Accelerator) | 5 |

*In Examples 5 and 6, the condensate of demethyl ethanol amine with toluene diisocynate (2:1 mol ratio) was substituted.

TABLE I

| Crosslinking Agent | Example 1 2% EGD | Example 2 2% TPT |
|---|---|---|
| Mols Crosslinking Agent (per 100 g. monomer) | 0.01010 | 0.00592 |
| No. Methacrylate Groups (per 100 g. monomer) | $12.1 \times 10^{21}$ | $10.7 \times 10^{21}$ |

TABLE I-continued

| Crosslinking Agent | Example 1 2% EGD | Example 2 2% TPT |
|---|---|---|
| Raw Mooney (1 + 2½min.) | 46 | 51 |
| Raw Mooney (1 + 4 min.) | 42 | 48 |
| Mooney Scorch (min.) | 14 | 13 |
| Shore A Hardness | 59.5 | 61.5 |
| Tensile Properties | | |
| 300% Modulus (psi) | 1250 | 1425 |
| Tensile strength (psi) | 2975 | 3025 |
| % Elongation | 370 | 330 |
| Monsanto Rheometer | | |
| Minimum Torque | 5.75 | 8.75 |
| Scorch Time (min.) | 2.75 | 2.75 |
| Torque at 30 minutes | 42.3 | 46.0 |
| Time to 90% Cure (min.) | 22 | 20 |
| Extrusion Data: | | |
| Rate (in./min.) | 73.1 | 96.0 |
| Output (g./min.) | 44.8 | 47.8 |
| Die Swell (percent) | 117.5 | 76.8 |
| Tear Test (psi) | 177.1 | 175.8 |

EXAMPLES 3–8

The latexes employed in Examples 3–8 are prepared by the same procedure as in Examples 1 and 2 according to the recipes below. The blend ratio of sol to gel was 3 parts to 1, and the testing was carried out on the carbon black compound described above. (In Examples 5 and 6, demethyl ethanol amine condensate with toluene diisocyanate (2:1 mol ratio) was substituted for 2-mercapto-2-imidazoline as the accelerator in the carbon black compound).

LATEX RECIPES (Examples 3–8)

| EXAMPLE | 3 | | 4 | | 5 | | 6 | | 7 | | 8 | |
|---|---|---|---|---|---|---|---|---|---|---|---|---|
| FORM | Sol | Gel | Sol | Gel | Sol | Gel | Sol | Gel | Sol | Gel | Sol | Gel |
| Chloroprene[1] | 100.000 | 98.000 | 100.000 | 98.000 | 100.000 | 98.000 | 100.000 | 98.000 | 100.000 | 98.000 | 100.000 | 98.000 |
| Modifier | | | | | | | | | | | | |
| Diisopropyl xanthogen disulfide | 0.67 | 0.350 | | 0.350 | 0.67 | 0.350 | | 0.350 | | TAB. | | |
| Dodecyl mercaptan | | | 0.24[3] | | | | 0.24[3] | | 0.24[3] | | TAB. IV 0.24[3] | |
| CROSSLINKING AGENT | | | | | | | | | | | | |
| 1,3-Butyl glycol dimethacrylate | | | | | | | | | | | | |
| Trimethylol propane trimethacrylate | | | | | | | | | | | | 2.000 |
| Disproportionated rosin[2] | 3.500 | 2.000 | 3.500 | 2.000 | 3.500 | 2.000 | 3.500 | 2.000 | 3.500 | 2.000 | 3.500 | 3.500 |
|  | 0.100 | 3.500 | 0.100 | 3.500 | 0.100 | 3.500 | 0.100 | 3.500 | 0.100 | 3.500 | 0.100 | 0.100 |
| Butylated hydroxy toluene | | 0.100 | | 0.100 | | 0.100 | | 0.100 | | 0.100 | | |
| Water | 100.000 | 100.000 | 100.000 | 100.000 | 100.000 | 100.000 | 100.000 | 100.000 | 100.000 | 100.000 | 100.000 | 100.000 |
| Sodium hydroxide | 0.600 | 0.750 | 0.600 | 0.750 | 0.600 | 0.750 | 0.600 | 0.750 | 0.600 | 0.750 | 0.600 | 0.750 |
| sodium salt of the condensate of naphthalene sulfonic acid and formaldehyde | 0.700 | 0.700 | 0.700 | 0.700 | 0.700 | 0.700 | 0.700 | 0.700 | 0.700 | 0.700 | 0.700 | 0.700 |
| Sodium sulfite | 0.300 | 0.300 | 0.300 | 0.300 | 0.300 | 0.300 | 0.300 | 0.300 | 0.300 | 0.300 | 0.300 | 0.300 |
| Monomer conversion % | 70 | ~100 | 70 | ~100 | 70 | ~100 | 70 | ~100 | 70 | ~100 | 70 | ~100 |

[1]Recipe quantities in phrm
[2]Hercules 731-SA
[3]± 0.01

EXAMPLES 3-6

In these examples, sols made with a dialkyl xanthogen disulfide and a dialkyl mercaptan were compared using trimethyol propane trimethacrylate (TPT) as the gel crosslinking agent. This comparison was made with two different curing systems. The blends were very similar in physical properties, notwithstanding the modifier employed. The test results are in TABLE II.

TABLE II

| EXAMPLE | 3 | 4 | 5 | 6 |
|---|---|---|---|---|
| Accelerator | 2-Mercapto-2-imidazoline | | dimethylethanolamine + toluene diisocyanate[1] (2:1 mol ratio) | |
| Modifier | diisopropyl xanthogen disulfide | dodecyl mercaptan | diisopropyl xanthogen disulfide | dodecyl mercaptan |
| Compounded Mooney (1 + 2½) | 75.5 | 77.0 | 70.5 | 72.0 |
| Compounded Mooney (1 + 4) | 73.0 | 75.0 | 68.0 | 69.0 |
| Scorch (10 point rise) | 11.2 | 11.4 | 14.6 | 16.4 |
| Shore A Hardness | 61.0 | 60.5 | 63.0 | 57.0 |
| Tensile Properties | | | | |
| 100% Modulus (psi) | 525 | 475 | 475 | 425 |
| 300% Modulus (psi) | 2550 | 2425 | 2025 | 1825 |
| Tensile Strength (psi) | 3150 | 3150 | 3500 | 3450 |
| % Elongation | 350 | 375 | 475 | 525 |
| Monsanto Rheometer | | | | |
| Minimum Torque | 27.5 | 30.0 | 27.0 | 27.5 |
| Scorch Time (min.) | 2.5 | 3.4 | 3.0 | 3.7 |
| Torque at 40 minutes | 110 | 101 | 102 | 75 |
| Time to 80% Cure (min.) | 14.3 | 12.0 | 15.5 | 14.0 |
| Extrusion Data | | | | |
| Rate (in./min.) | 23.4 | 24.5 | 24.8 | 24.6 |
| Output (g./min.) | 56.4 | 60.3 | 57.5 | 58.8 |
| Die Swell (percent) | 35.4 | 38.1 | 30.3 | 34.2 |

[1]hereafter designated as dimethyl diisocyanate.

EXAMPLE 7

In this example, the effect of modifier level in the gel and its importance in the TPT crosslinked system is demonstrated. The variation in level of diisopropyl xanthogen disulfide, and the test results are given below in TABLE III.

TABLE III

| Diisopropyl Xanthogen Disulfide Modifier Level (phm) | Compound Mooney ML 1 + | | Scorch 10 Pt. Rise | Shore A Hard. | Modulus | | Tensiles (psi) | Elong. (%) | Monsanto Rheometer | | | | Extrusion | | Die Swell (%) |
|---|---|---|---|---|---|---|---|---|---|---|---|---|---|---|---|
| | 2.5 | 4.0 | | | 100% | 300% | | | Min. Torq. | Scorch Time | T-40 | 80% Cure | In/Min | G./Min | |
| 0.000 | 79 | 76 | 9.8 | 64 | 475 | 2500 | 2750 | 330 | 29 | 3 | 117 | 15.5 | 22.6 | 53.6 | 33.3 |
| 0.175 | 78 | 75.5 | 10.6 | 62 | 500 | 2550 | 2875 | 335 | 30 | 3.3 | 111 | 14.8 | 21.5 | 52.4 | 37.0 |
| 0.350 | 77 | 75.0 | 11.4 | 60.5 | 475 | 2425 | 3150 | 375 | 30 | 3.4 | 101 | 12 | 24.5 | 60.3 | 38.1 |
| 1.000 | 71 | 69.5 | 10.8 | 57 | 425 | 2250 | 3175 | 410 | 26.5 | 2.5 | 98 | 16 | 22.6 | 64.0 | 59.0 |

EXAMPLE 8

In this set of runs, a difunctional ester crosslinking agent, 1,3-butylene glycol dimethacrylate, was employed. It can be seen that the presence of diisopropyl xanthogen disulfide modifier in the gel is detrimental for most of the properties of the blend. The amount of modifier and the test results are shown in TABLE IV below.

TABLE IV

| Diisopropyl Xanthogen Disulfide Modifier Level (phm) | Compound Mooney ML 1 + | | Scorch 10 Pt. Rise | Shore A Hard. | Modulus | | Tensiles (psi) | Elong. (%) | Monsanto Rheometer | | | | Extrusion | | Die Swell (%) |
|---|---|---|---|---|---|---|---|---|---|---|---|---|---|---|---|
| | 2.5 | 4.0 | | | 100% | 300% | | | Min. Torq. | Scorch Time | T-40 | 80% Cure | In/Min | G./Min | |
| 0.000 | 84 | 80 | 11.4 | 61.5 | 500 | 2375 | 3250 | 375 | 30 | 3.3 | 106 | 11.5 | 24.2 | 57.5 | 33.5 |
| 0.175 | 78 | 76 | 10.8 | 62 | 450 | 2200 | 3100 | 400 | 29 | 3.0 | 107 | 14.7 | 22.5 | 56.6 | 41.3 |
| 0.350 | 77 | 74 | 11.0 | 61 | 475 | 2250 | 3150 | 400 | 27 | 3.4 | 104 | 14 | 21.9 | 55.9 | 43.1 |

EXAMPLES 9-20

These examples are presented to further show that by using a crosslinking agent according to the present invention that the chain transfer agent employed in the sol is not critical to producing superior blends.

Preparation of Sol

| COMPONENTS OF CHARGE | Parts by Weight |
|---|---|
| Monomer Solution | |
| Chloroprene | 100.000 |
| Disproportionated Rosin[1] | 3.047 |
| Modifier | Variable |
| Butylated hydroxytoluene (BHT) | 0.100 |
| Water Solution | |
| Water | 100.000 |
| NOPCO 1338C[2] | 0.75 |
| Sodium Hydroxide (100%) | 0.54 |
| Sodium Sulfite | 0.300 |
| Catalyst** | |
| Water | 98.18 |
| Silver Salt | 0.115 |

-continued

| | |
|---|---|
| Potassium Persulfate | 0.70 |
| Shortstop | |
| Tertiary-butylcatechol | 0.020 |
| Phenothiazine | 0.020 |
| Chloroprene (washed) | 0.800 |
| Antifoam A[(3)] | 0.005 |
| SDD4[(4)] | 0.020 |
| NOPCO 1338C[(2)] | 0.010 |
| Water | 0.800 |
| Octamine[(5)] | 0.020 |
| CONDITIONS | |
| Polymerization Temperature, °C under nitrogen | 40 (104 °F) |
| Polymerization Time, Hrs. | 3 (Approx.) |
| Conversion, % | 68 |
| %Solids After Shortstop | 35.49 |
| Mooney Viscosity (ML 1 + 2½) | 35–40 |

| COMPONENTS OF CHARGE | Parts by Weight per 100 Total Monomer |
|---|---|
| Monomer Solution | |
| Chloroprene | 98.000 |
| Trimethylol propane trimethacrylate | 2.000 |
| Disproportionated rosin[(1)] | 3.047 |
| Dodecyl mercaptan | 0.30 |
| Butylated hydroxytoluene (BHT) | 0.100 |
| Water Solution | |
| Water | 100.000 |
| NOPCO 1338C[(2)] | 0.75 |
| Sodium Hydroxide (100%) | 0.540 |
| Sodium Sulfite | 0.300 |
| 1st Catalyst Solution** | |
| Water | 99.600 |
| Silver Salt | 0.070 |
| Potassium Persulfate | 0.350 |
| 2nd Catalyst Solution** | |
| Water | 95.400 |
| Silver Salt | 0.115 |
| Potassium Persulfate | 4.500 |
| Shortstop | |
| Tertiary-butylcatechol | 0.020 |
| Phenothiazine | 0.020 |
| Chloroprene (washed) | 0.800 |
| Antifoam A[(3)] | 0.005 |
| SDD4[(4)] | 0.020 |
| NOPCO 1338C[(2)] | 0.010 |
| Water | 0.800 |
| Octamine[(5)] | 0.020 |
| CONDITIONS | |
| Polymerization Temperature, °C under nitrogen | 40 (104° F) |
| Polymerization Time, Hrs. | 4½ (Approx.) |
| Conversion, % | 90 |
| %Solids After Shortstop | 45.14 |
| Mooney Viscosity Contribution (ML 1 + 2½) | 85–90 |

[(1)]Hercules 731-SA
[(2)]Sodium salt of sulfonated oleic acid; Nopco Chemical Co.
[(3)]Silicone antifoamy agent; Dow-Corning
[(4)]Sodium dodecyl benzene sulfonate; Alcolac Chemical Corp.
[(5)]Octylated diphenyl amine; Nagatuch Chemical Co.
**These numbers represent a % mix and are not related to the amount to be used. The amount used will be that necessary to maintain the polymerization rate.
***After approximately two hours when the polymerization rate begins to drop off, a stronger catalyst solution is used to drive the polymerization to final conversion. This usually occurs between 50 to 60% conversion.

The recovered latex from each preparation was steam stripped to remove unreacted monomer. The latex was then acidified to a pH of 6.3 using 10% acetic acid solution and isolated by freeze roll.

The sol and gel of each of the present examples were blended in the ratio of 3 parts sol to 1 part gel, based on solids in the latexes and a carbon black compound for testing prepared according to the formulation given in Examples 1 and 2, except that in Examples 9–14 the accelerator was ethylene thiourea and in Examples 15–20 the accelerator was dimethyl diisocyanate.

Examples 9–14 are set out in TABLE V and Examples 15–20 are set out in TABLE VI. Each set of runs according to the invention are compared to a commercial product believed to be in accordance with the disclosure of U.S. Pat. No. 3,655,827 wherein the sol modifier is a dialkyl xanthogen disulfide and the cross-linking agent is ethylene dimethacrylate. It can be seen that the use of a crosslinking agent according to the present invention does not require the use of dialkyl xanthogen disulfide as the modifier in the sol portion of the blend (as taught in U.S. Pat. No. 3,655,827) in order to obtain excellent sol-gel blends.

TABLE V

ACCELERATOR-ETHYLENE THIOUREA

| EXAMPLE | Sol Modifier | Raw Mooney ML 2½+4 | Raw Aged Mooney 3 Day |
|---|---|---|---|
| 9 | dodecyl mercaptan | 47.0/44.0 | 50.0/46.5 |
| 10 | diisopropyl xanthogen disulfide | 55.0/52.0 | 59.0/55.0 |
| 11 | diethyl xanthogen disulfide | 50.0/47.0 | 53.0/49.5 |
| 12 | di(o-ethyl dithiocarbonoxy) sulfide | 46.5/43.5 | 52.0/49.0 |
| 13 | di(o-ethyl dithiocarbonoxy) disulfide | 51.5/48.5 | 57.5/54.0 |
| 14 | dialkyl xanthogen disulfide* | — | — |

Additional Blend Properties

| EXAMPLE | Sol Modifier | Mooney Scorch minutes | Shore A Hardness | Modulus, psi 200% | 300% | 400% | Tensile psi | % Elongation |
|---|---|---|---|---|---|---|---|---|
| 9 | dodecyl mercaptan | 10.2 | 61 | 1215 | 2310 | — | 3090 | 380 |
| 10 | diisopropyl xanthogen disulfide | 10.4 | 62.5 | 1280 | 2450 | — | 3260 | 380 |
| 11 | diethyl xanthogen disulfide | 9.4 | 63.0 | 1335 | 2500 | — | 3190 | 370 |
| 12 | di(o-ethyl dithiocarbonoxy) sulfide | 7.3 | 64.5 | 1480 | 2745 | — | 3140 | 340 |
| 13 | di(o-ethyl dithiocarbonoxy) disulfide | 7.2 | 63.5 | 1400 | 2655 | — | 3195 | 350 |
| 14 | dialkyl xanthogen disulfide* | 7.8 | 64.0 | 1400 | 2825 | — | 3165 | 330 |

Additional Blend Properties
Monsanto Rheometer

| EXAMPLE | Sol Modifier | Minimum Torque inch lbs. | Scorch minutes | Torque at 30 minutes (T$_{30}$) inch lbs. | Optimum Torque inch lbs. | Optimum Time | % Die Swell[3] |
|---|---|---|---|---|---|---|---|
| 9 | dodecyl mercaptan | 9.2 | 2.5 | 44.4 | 40.9 | 18.5 | 47.4 |
| 10 | diisopropyl xanthogen | 9.9 | 2.2 | 49.2 | 45.3 | 18.1 | 47.4 |

TABLE V-continued

| | | | | | | | |
|---|---|---|---|---|---|---|---|
| | disulfide | | | | | | |
| 11 | diethyl xanthogen disulfide | 10.6 | 2.2 | 49.5 | 45.6 | 18.5 | 44.3 |
| 12 | di(o-ethyl dithiocarbonoxy) sulfide | 10.0 | 1.7 | 50.5 | 46.5 | 17.4 | 53.0 |
| 13 | di(o-ethyl dithiocarbonoxy) disulfide | 10.6 | 1.5 | 51.4 | 47.3 | 17.0 | 45.2 |
| 14 | dialkyl xanthogen disulfide* | 10.9 | 1.8 | 52.1 | 48.0 | 19.3 | 63.4 |

*Commercial neoprene blend-Dupont TW; product of Dupont Co.; sol modifier believed to be diethyl xanthogen disulfide.

TABLE VI

ACCELERATOR - DIMETHYL DIISOCYANATE

| EXAMPLE | Sol Modifier | Mooney Scorch minutes | Shore A Hardness |
|---|---|---|---|
| 15 | dodecyl mercaptan | 21.0 | 56.5 |
| 16 | diisopropyl xanthogen disulfide | 18.0 | 60.5 |
| 17 | diethyl xanthogen disulfide | 19.0 | 62.0 |
| 18 | di(o-ethyl dithiocarbonoxy) sulfide | 11.6 | 62.5 |
| 19 | di(o-ethyl dithiocarbonoxy) disulfide | 10.2 | 62.5 |
| 20 | dialkyl xanthogen disulfide* | 11.5 | 64.0 |

Additional Blend Properties

| EXAMPLE | Modulus, psi 200% | 300% | 400% | Tensile psi | % Elongation | Minimum Torque inch lbs. | Scorch minutes | Monsanto Rheometer Torque at 30 minutes ($T_{30}$) inch lbs. | Optimum Torque inch lbs. | Optimum Time |
|---|---|---|---|---|---|---|---|---|---|---|
| 15 | 905 | 1615 | 2280 | 3110 | 540 | 8.7 | 4.0 | 33.5 | 31.0 | 22.1 |
| 16 | 1120 | 2020 | 2940 | 3315 | 450 | 9.5 | 3.3 | 45.0 | 41.5 | 21.6 |
| 17 | 1200 | 2145 | 3075 | 3375 | 440 | 8.8 | 3.6 | 47.3 | 43.5 | 23.0 |
| 18 | 1170 | 2140 | 3055 | 3300 | 440 | 9.2 | 2.5 | 48.0 | 44.1 | 20.7 |
| 19 | 1135 | 2090 | 3020 | 3345 | 430 | 9.6 | 2.3 | 48.5 | 44.6 | 20.1 |
| 20 | 1280 | 2305 | 3210 | 3395 | 430 | 10.2 | 2.6 | 51.8 | 47.6 | 20.5 |

*Dupont TW

The invention claimed is:

1. A polychloroprene sol-gel elastomer composition comprising an intimate mixture of:
   a benzene-soluble polymer prepared by polymerizing polymerizable monomer comprising chloroprene to a monomer conversion at which benzene-soluble polymer is obtained in aqueous emulsion containing the chloroprene and a sulfur containing chain-transfer agent, and
   a benzene-insoluble polymer prepared by polymerizing polymerizable monomer comprising at least 50 percent polychloroprene having present in the polymerization system from about 0.5 to 20 weight percent, based on total monomers of a crosslinking agent consisting of a triester having the general formula:

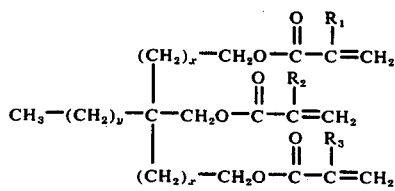

wherein $x$ is 0 or an integer of from 1 to 4, $y$ is 0 or an integer of from 1 to 4, and $R_1$, $R_2$ and $R_3$ represent hydrogen or an alkyl radical with from 1 to 4 carbon atoms wherein said chain transfer agent is an alkyl mercaptan said alkyl group having 1 to 18 carbon atoms.

2. The polychloroprene blend according to claim 1 wherein the soluble polymers are prepared by polymerizing monomer comprising at least 75 percent chloroprene.

3. The polychloroprene blend according to claim 2 weight ratio of benzene soluble polymer to benzene insoluble polymer is from 95:5 to 20:80.

4. The polychloroprene blend according to claim 3 wherein the ratio is 50:50 to 80:20.

5. The polychloroprene blend according to claim 1 wherein said alkyl mercaptan is dodecyl mercaptan.

6. The polychloroprene blend according to claim 1 wherein a sulfur containing chain-transfer agent is present during the preparation of the benzene insoluble polymer.

7. The polychloroprene blend according to claim 6 where about 0.09 to 1.5 parts per hundred parts of total monomer of said benzene insoluble polymer chain-transfer agent are present.

8. The polychloroprene blend according to claim 7 where said benzene insoluble polymer chain-transfer agent is selected from the group consisting of alkyl mercaptans, dialkyl xanthogen disulfides and polysulfides having the formula

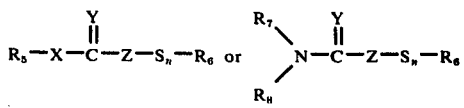

wherein X, Y, and Z are selected from the group consisting of oxygen and sulfur, $R_5$ is a hydrocarbon radical having 1 to 8 carbon atoms, $R_6$ is a hydrocarbon radical having 1 to 8 carbon atoms or is a radical of the general structure

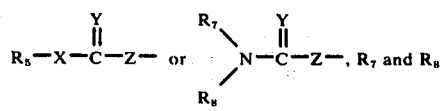

, $R_7$ and $R_8$ are selected from the group consisting of hydrocarbon radicals having 1 to 8 carbon atoms or hydrogen with at least one of $R_7$ and $R_8$ not being hydrogen and $n$ is 1 to 4.

9. The polychloroprene sol-gel blend elastomer composition according to claim 2 wherein said triester is present in an amount of from about 0.5 to about 10 weight percent based on total monomers.

10. A polychloroprene sol-gel elastomer composition comprising an intimate mixture of:
  a benzene-soluble polymer prepared by polymerizing polymerizable monomer comprising chloroprene to a monomer conversion at which benzene-soluble polymer is obtained in aqueous emulsion containing the chloroprene and a sulfur containing chain-transfer agent, and
  a benzene-insoluble polymer prepared by polymerizing polymerizable monomer comprising at least 50 percent polychloroprene having present in the polymerization system from about 0.5 to 20 weight percent, based on total monomers of a crosslinking agent consisting of a triester having the general formula:

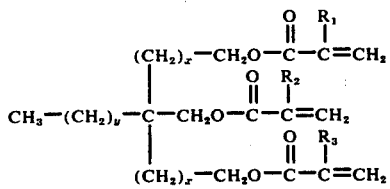

wherein $x$ is 0 or an integer from 1 to 4, $y$ is 0 or an integer of from 1 to 4, and $R_1$, $R_2$ and $R_3$ represent hydrogen or an alkyl radical with from 1 to 4 carbon atoms wherein said chain transfer agent is a polysulfide having the formula:

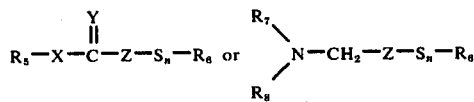

wherein X, Y and Z are selected from the group consisting of oxygen and sulfur, $R_5$ is a hydrocarbon radical having 1 to 8 carbon atoms, $R_6$ is a hydrocarbon radical having 1 to 8 carbon atoms or is a radical of the general structure

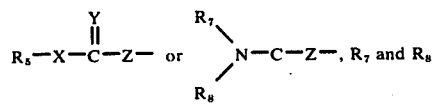

are selected from the group consisting of hydrocarbon radicals having 1 to 8 carbon atoms or hydrogen with at least one of $R_7$ and $R_8$ not being hydrogen and $n$ is 1 to 4.

11. The polychloroprene blend according to claim 10 wherein said polysulfide has the general structure:

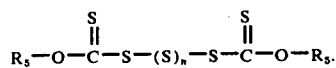

12. The polychloroprene blend according to claim 11 wherein the polysulfide has the general structure:

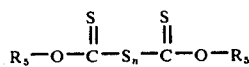

wherein $n$ is 3 to 4.

13. The polychloroprene blend according to claim 12 wherein the polysulfide is di(o-isopropyl dithiocarbonoxy) sulfide.

14. The polychloroprene blend according to claim 10 wherein $x$ is 0, $y$ is 1 and $R_1$, $R_2$, $R_3$ are H or O—$CH_3$ radical.

15. The polychloroprene blend according to claim 14 wherein $R_1$, $R_2$ and $R_3$ are H.

16. The polychloroprene blend according to claim 14 wherein $R_1$, $R_2$ and $R_3$ are each —$CH_3$.

17. The polychloroprene blend according to claim 10 wherein the soluble polymers are prepared by polymerizing monomer comprising at least 75 percent chloroprene.

18. The polychloroprene blend according to claim 17 weight ratio of benzene soluble polymer to benzene insoluble polymer is from 95:5 to 20:80.

19. The polychloroprene blend according to claim 18 wherein said ratio is 50:50 to 80:20.

20. The polychloroprene sol-gel blend elastomer composition according to claim 17 wherein said triester is present in an amount of from about 0.5 to about 10 weight percent based on total monomers.

21. The polychloroprene blend according to claim 10 wherein a sulfur containing chain-transfer agent is present during the preparation of the benzene insoluble polymer.

22. The polychloroprene blend according to claim 21 where about 0.09 to 1.5 parts per hundred parts of total monomer of said benzene insoluble polymer chain-transfer agent are present.

23. The polychloroprene blend according to claim 22 where said benzene insoluble polymer chain-transfer agent is selected from the group consisting of alkyl mercaptans, dialkyl xanthogen disulfides and polysulfides having the formula

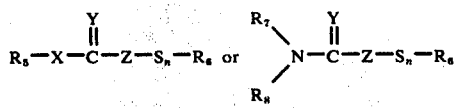

wherein X, Y, and Z are selected from the group consisting of oxygen and sulfur, $R_5$ is a hydrocarbon radical having 1 to 8 carbon atoms, $R_6$ is a hydrocarbon radical having 1 to 8 carbon atoms or is a radical of the general structure

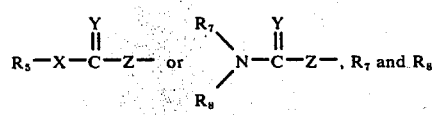

are selected from the group consisting of hydrocarbon radicals having 1 to 8 carbon atoms or hydrogen with at least one of $R_7$ and $R_8$ not being hydrogen and $n$ is 1 to 4.

24. The polychloroprene blend according to claim 23 wherein said benzene insoluble polymer chain-transfer agent is a dialkyl xanthogen disulfide.

25. A polychloroprene sol-gel elastomer composition comprising an intimate mixture of:
  a benzene-soluble polymer prepared by polymerizing polymerizable monomer comprising chloroprene to a monomer conversion at which benzene-soluble polymer is obtained in aqueous emulsion containing the chloroprene and an alkyl mercaptan chain-transfer agent, said alkyl group having 1 to 18 carbon atoms, and a benzene-insoluble polymer prepared by polymerizing polymerizable monomer comprising at least 50 percent polychloroprene having present in the polymerization system from about 0.5 to 20 weight percent, based on total monomer of a crosslinking agent consisting of a triester having the general formula:

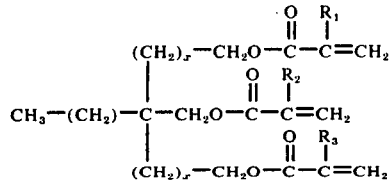

wherein $x$ is 0 or an integer of from 1 to 4, $y$ is 0 or an integer of from 1 to 4, and $R_1$, $R_2$ and $R_3$ represent hydrogen or an alkyl radical with from 1 to 4 carbon atoms there additionally being present during the preparation of the benene insoluble polymer about 0.09 to 1.5 parts of a dialkyl xanthogen disulfide chain transfer agent per hundred parts of total monomer.

* * * * *

UNITED STATES PATENT OFFICE
CERTIFICATE OF CORRECTION

PATENT NO. : 4,035,446
DATED : July 12, 1977
INVENTOR(S) : Edwin F. Hoff, Jr.

It is certified that error appears in the above-identified patent and that said Letters Patent are hereby corrected as shown below:

Column 1, line 21 reads "low" but should read -- lower --

Column 3, lines 49-53, Formula reads "$\overset{R_7}{\phantom{x}} \overset{Y}{\underset{R_8}{N-\overset{\|}{C}-Z-,}}$"

but should read -- $\overset{R_7}{\underset{R_8}{>}} N-\overset{\overset{Y}{\|}}{C}-Z,$ --

Column 3, line 67 reads "compounds which are" but should read -- compounds are --

Column 4, line 61 reads "mixtured" but should read -- mixed --

Column 6, line 16 reads "anthraquinine" but should read -- anthraquinone --.

Signed and Sealed this

Eleventh Day of March 1980

[SEAL]

Attest:

SIDNEY A. DIAMOND

Attesting Officer

Commissioner of Patents and Trademarks